(12) United States Patent
Bopanna et al.

(10) Patent No.: US 9,428,234 B2
(45) Date of Patent: Aug. 30, 2016

(54) PANNIER MOUNTING SYSTEM

(71) Applicant: Timbuk 2 Designs, Inc., San Francisco, CA (US)

(72) Inventors: Ulliyada Bopanna, San Francisco, CA (US); Daniel Kim, Pleasanton, CA (US); Greg Bass, Oakland, CA (US)

(73) Assignee: TIMBUK 2 DESIGNS, INC., San Francisco, CA (US)

( * ) Notice: Subject to any disclaimer, the term of this patent is extended or adjusted under 35 U.S.C. 154(b) by 0 days.

(21) Appl. No.: 14/320,289

(22) Filed: Jun. 30, 2014

(65) Prior Publication Data

US 2015/0344089 A1   Dec. 3, 2015

Related U.S. Application Data

(60) Provisional application No. 62/003,424, filed on May 27, 2014.

(51) Int. Cl.
*B62J 9/00* (2006.01)
*H01F 7/02* (2006.01)

(52) U.S. Cl.
CPC .............. *B62J 9/00* (2013.01); *H01F 7/0252* (2013.01)

(58) Field of Classification Search
CPC .............. B62J 9/00; B62J 7/08; B62J 11/00; B62J 9/001; B62J 7/00; B62J 7/04
USPC .................................................. 224/429, 430
See application file for complete search history.

(56) References Cited

U.S. PATENT DOCUMENTS

| | | | | |
|---|---|---|---|---|
| 4,773,573 A | * | 9/1988 | Doveri | B62J 9/00 224/413 |
| 2009/0308903 A1 | | 12/2009 | Vigeant et al. | |
| 2010/0108729 A1 | | 5/2010 | Golub et al. | |
| 2010/0237120 A1 | * | 9/2010 | Muhlberger | B62J 11/00 224/562 |
| 2011/0001025 A1 | * | 1/2011 | Fiedler | A45C 13/1069 248/206.5 |
| 2011/0138583 A1 | | 6/2011 | Fiedler | |

FOREIGN PATENT DOCUMENTS

WO   WO2011116758 A2   9/2011

OTHER PUBLICATIONS

MagIQ, A New Standard to Fix What You Need Where You Need It On Your Bike, [retrieved on Jun. 30, 2014, from: http://www.curana.com/index.php/products/magiq1/magiq1/].

(Continued)

*Primary Examiner* — Adam Waggenspack
(74) *Attorney, Agent, or Firm* — Vierra Magen Marcus LLP

(57) ABSTRACT

A pannier mounting system enables a pannier container to be quickly and easily attached to and detached from a rack of a bicycle, motorcycle, or the like. In an embodiment, the system includes a rack attachment bracket that attaches to the rack, a first pair of connectors attached to the bracket, and a second pair of connectors attached to a side of the pannier container. Each of the first pair of connectors includes a magnet, and each of the second pair of connectors includes a magnet. Attraction between magnets of the first pair of connectors and magnets of the second pair of connectors cause the first and second pairs of connectors to align with and connect to one another when brought within close proximity to one another, thereby attaching the pannier container to the bracket. A pannier release handle is used to detach the pannier container from the bracket.

23 Claims, 6 Drawing Sheets

(56) References Cited

OTHER PUBLICATIONS

Fidlock, Curana magIQ—SNAP Application Bike Luggage System, [retrieved on Jun. 30, 2014, from: http://www.fidlock.com/en/applications/curana-magiq.html.

Thule, Thule Pack 'n Pedal Panniers Instruction Manual, [retrieved on Jun. 30, 2014, from: http://www.thule.com/en-us/us/products/luggage-and-bags/bike-bags-and-racks/pannier-bags/thule-pack-n-pedal-large-adventure-touring-pannier-_-pp_100005].

Ortlieb, Back-Roller City, [retrieved on Jun. 30, 2014, from: http://www.ortlieb.com/_pdf_en/backrollercity.pdf].

Fidlock, Products—Hook, [retrieved on Jun. 30, 2014, from: http://www.fidlock.com/en/fasteners/hook/15.html].

Chrome, Installation Instructions, 71603 Saddle Bag Rolltop 20 Rack Mount System [retrieved on Jun. 30, 2014, from: http://www.chromeindustries.com/media/wysiwyg/PDF/ChromeKW_SaddleBag_Diagram.pdf].

* cited by examiner

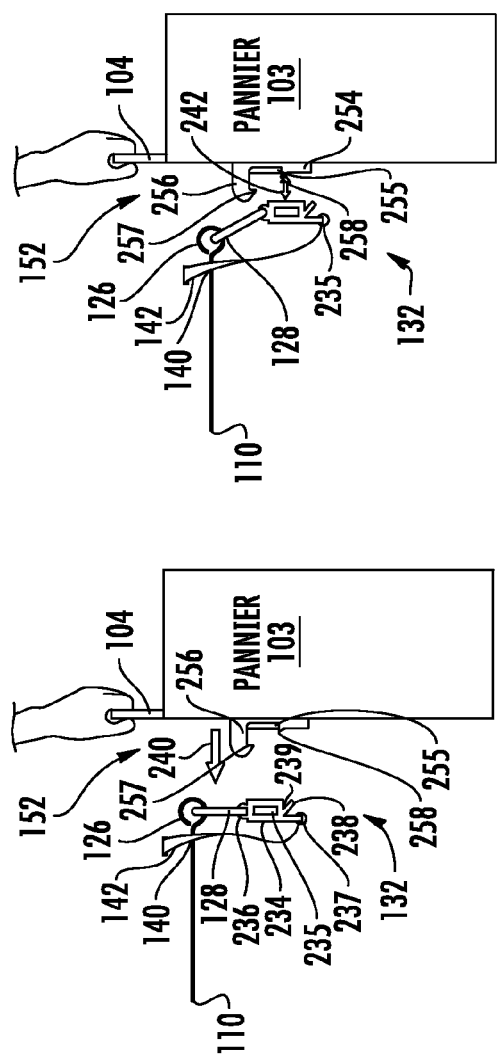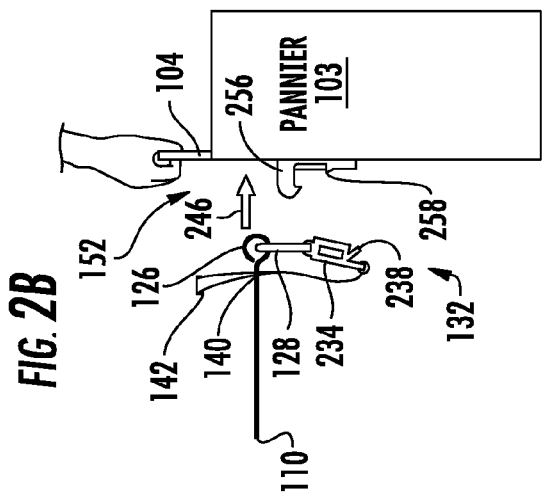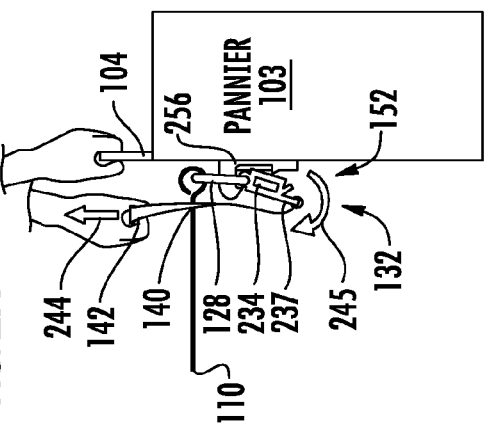

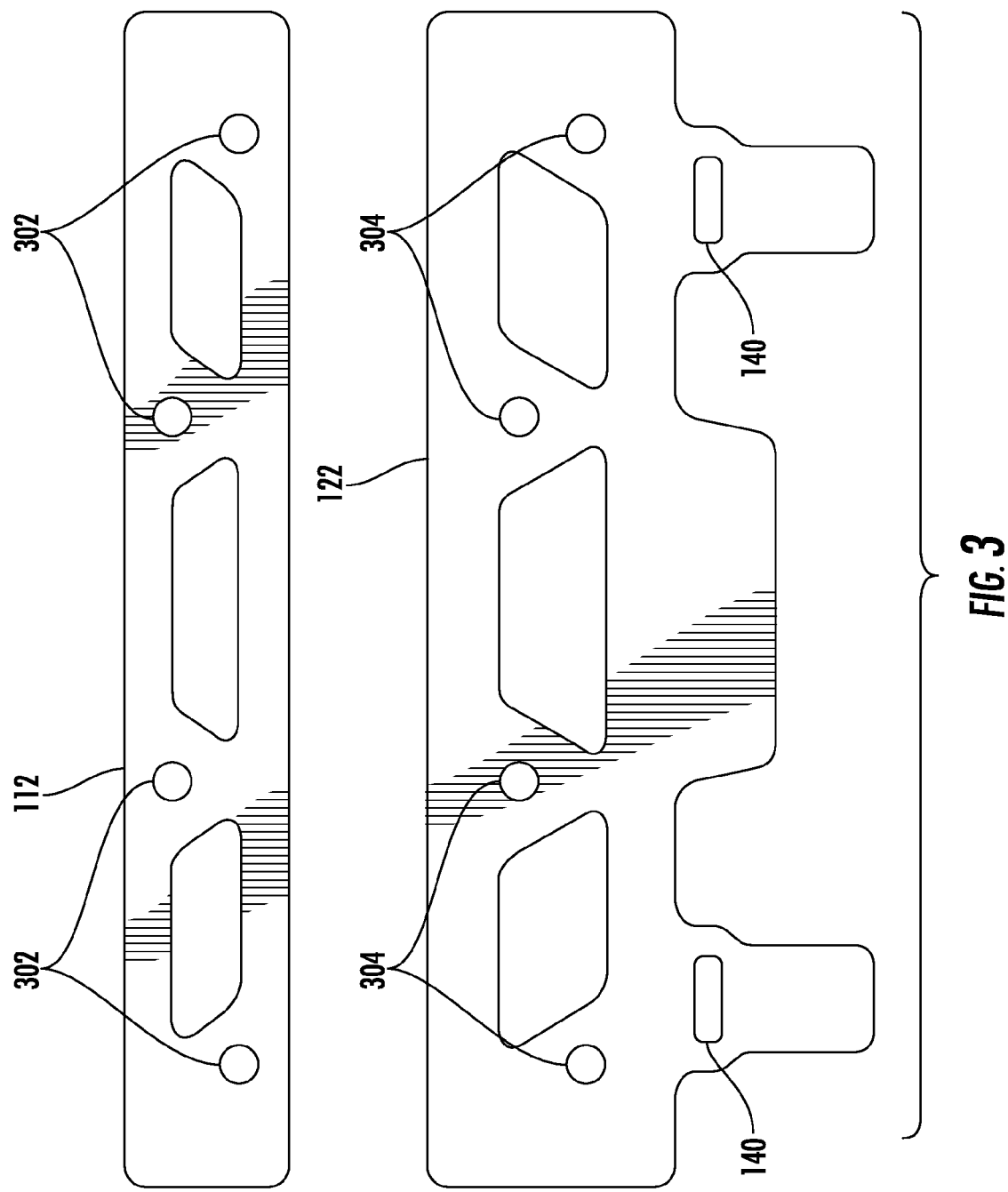

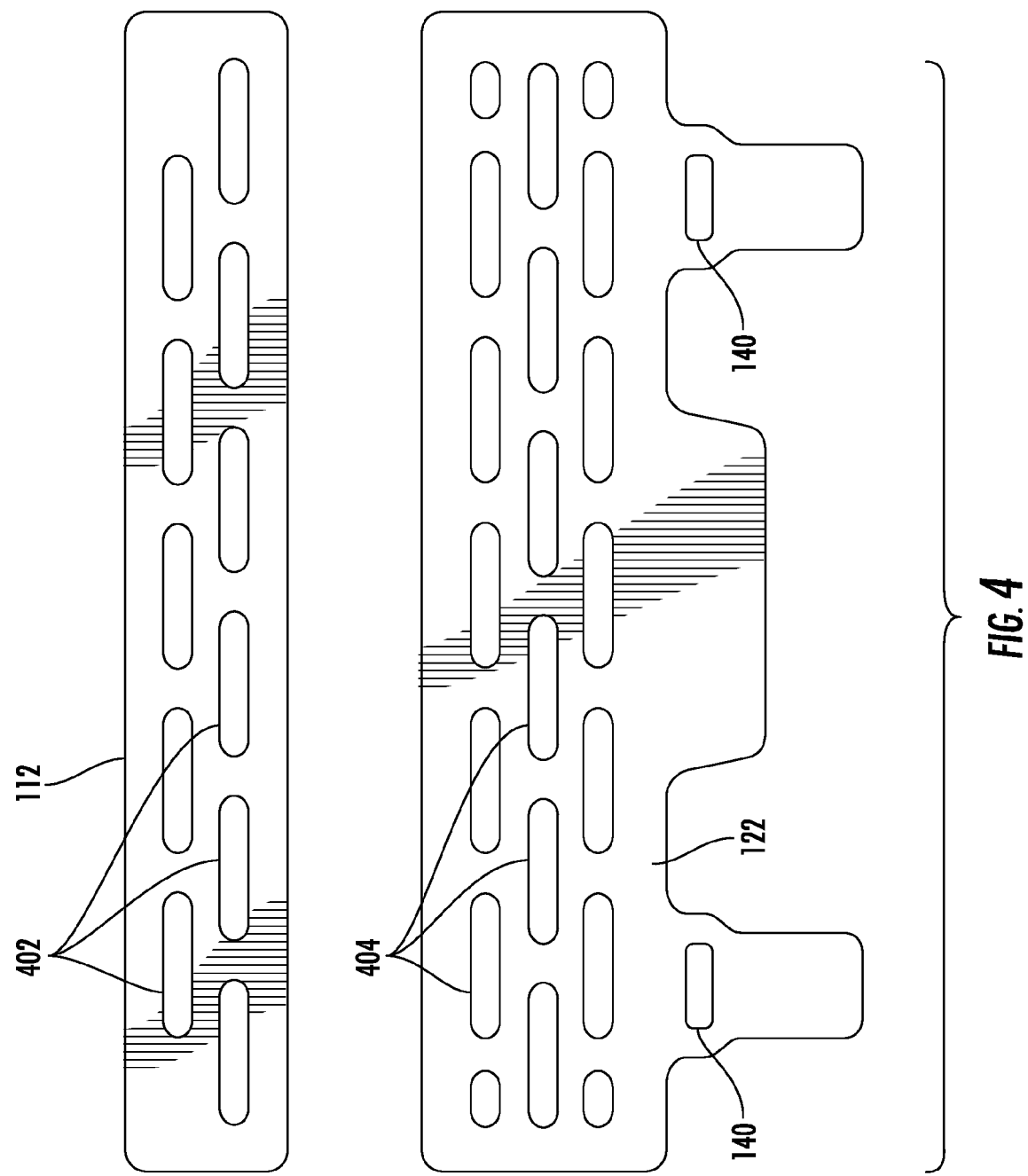

US 9,428,234 B2

PANNIER MOUNTING SYSTEM

PRIORITY CLAIM

This application claims priority to U.S. Provisional Patent Application No. 62/003,424 titled PANNIER MOUNTING SYSTEM, filed May 27, 2014, which is incorporated herein by reference.

BACKGROUND

Panniers, which are also known as saddle bags, are containers that attach to bicycles, motorcycles, or the like, to enable riders to carry accessories and other supplies with them without requiring that the riders carry such supplies on their back, e.g., in a backpack. A pannier is typically attachable to, and detachable from, a rack that extends over the back wheel or front wheel of a bicycle, motorcycle, or the like. More specifically, catches, hooks or similar attachment mechanism are often used to attach a pannier to a rack (e.g., a bicycle rack). A problem with most such panniers is that it is often time consuming and/or frustrating for riders to line up the catches, hooks or similar attachment mechanisms with the physical features of the racks where attachment mechanisms are intended to attach. Additionally, it is often time consuming and/or frustrating for riders to remove panniers from racks. For example, many types of panniers require the independent manipulation of multiple fasteners in order to secure panniers to racks, as well as to remove panniers from racks. This is especially inconvenient in urban environments where riders may want to frequency attach and remove panniers to and from racks.

Another drawback of some panniers is that they are configured to attach with only specific racks designed and sold by the same company that designs and sells the panniers. For example, the attachment mechanism of a pannier may be configured to attach to a rack rail having only a specific cross-sectional shape, which limits the usefulness of such a pannier where a rider has another type of rack already installed on their bicycle or motorcycle, and the rider does not wish to replace their current rack.

BRIEF DESCRIPTION OF THE DRAWINGS

FIGS. 2A-2E are side views of the pannier mounting system introduced in FIG. 1, wherein FIGS. 2A and 2B illustrate how to attach a pannier container to a rack, FIG. 2C illustrates the pannier container to the rack, and FIGS. 2D and 2E illustrate how to detach the pannier container from the rack.

FIG. 3 illustrates the shapes and dimensions for a lower plate and an upper plate of a rack attachment bracket, introduced in FIG. 1, according to an embodiment.

FIG. 4 illustrates the shapes and dimensions of a lower plate and an upper plate of the rack attachment bracket, introduced in FIG. 1, according to an alternative embodiment.

FIG. 6 is a high level flow diagram that is used to summarize methods, according to embodiments of the present invention, for quickly and easily attaching and detaching a pannier container to and from a rack of a bicycle, motorcycle, or the like.

SUMMARY

Figure 1:
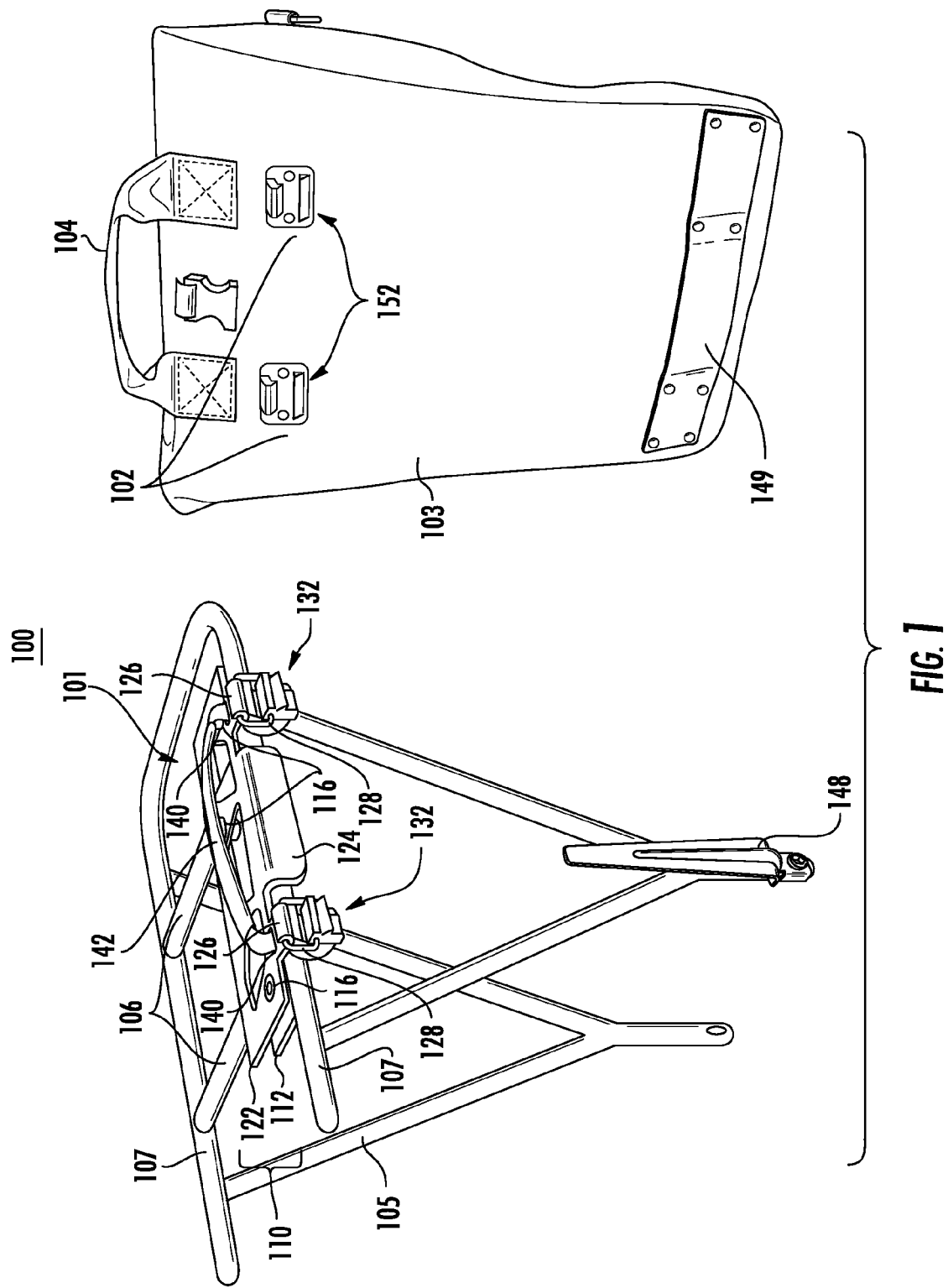
FIG. 1 shows a pannier mounting system, according to an embodiment of the present invention, which is useful for quickly and easily attaching and detaching a pannier container to and from a rack.

Embodiments of the present invention relate to a pannier mounting system for quickly and easily attaching and detaching a pannier container to and from a rack of a bicycle, motorcycle, or the like. In accordance with an embodiment, the pannier mounting system includes a rack attachment bracket that attaches to the rack, a first pair of connectors attached to the rack attachment bracket, and a second pair of connectors attached to a side of the pannier container. In an embodiment, each connector of the first pair of connectors includes a magnet, and each connector of the second pair of connectors includes a magnet. The pannier container is easily attached to the rack attachment bracket, and thereby to the rack (if the rack attachment bracket is attached to the rack) by bringing the first and second pairs of connectors in close proximity to one another, e.g., within about one inch of one another. More specifically, attraction between the magnets of the first pair of connectors and the magnets of the second pair of connectors cause the first and second pair of connectors to align with and connect to one another when they are brought within close proximity to one another.

In accordance with specific embodiments, when the first and second pairs of connectors are connected to one another, a downward facing surface of each connector of the second pair of connectors rests on and is supported by an upward facing surface of a corresponding one of the connectors of the first pair of connectors. Accordingly, it is not the attraction between the magnets that is being relied upon to support the weight of the pannier container. However, the magnets do assist in preventing inadvertent disengagement of the first and second pair of connectors, and thus inadvertent detachment of the pannier container from the rack.

In accordance with certain embodiments, the pannier mounting system also includes a pannier release handle that can be used to detach the pannier container from the rack attachment bracket, and thus from the rack if the rack attachment bracket is attached to the rack. In accordance with an embodiment, the pannier release handle includes a first end attached to one of the connectors of the first pair of connectors and a second end attached to the other one of the connectors of the first pair of connectors. The pannier release handle causes the first pair of connectors and the second pair of connectors to disconnect from one another when the pannier release handle is pulled, thereby detaching the pannier container from the rack attachment bracket, and thus detaching the pannier container from the rack if the rack attachment bracket is attached to the rack. In accordance with an embodiment, a graspable portion of the pannier release handle, which is between the first and second ends, rests above an upper surface of the rack attachment bracket and is thus easily accessible to be grasped and pulled.

In accordance with certain embodiments, the pannier mounting system includes a pair of rectangular rings that hang from the rack attachment bracket and that attach the first pair of connectors to the rack attachment bracket. More specifically, the first pair of connectors hang from the rectangular rings. The rectangular rings allow the first pair of connectors to move simultaneously sideways and upwards, towards the second pair of connectors, when the first and second pair of connectors are within close proximity to one another (e.g., within about one inch of one another), with the simultaneously sideways and upwards movement being caused by the attraction between the magnets of the first pair of connects and the magnets of the second pair of connectors. In accordance with an embodiment, the rack attachment bracket include a pair of ring holders each one of which holds the upper side of a different one of the pair of rectangular rings.

In accordance with certain embodiments, the rack attachment bracket includes an upper plate and a lower plate that are configured to be secured, respectively, above and below one or more crossbars or other portion(s) of a rack to thereby attach the bracket to the rack. In an embodiment, the upper plate includes the pair of ring holders that hold the aforementioned rectangular rings. In an embodiment, the upper plate includes a pair of slots that are aligned with and setback from the pair of ring holders. A first portion of the pannier release handle, which is adjacent the first end of the pannier release handle, passes through the first slot. A second portion of the pannier release handle, which is adjacent the second end of the pannier release handle, passes through the second slot. A center portion of the pannier release handle extends between the first and second slots and rests above the upper plate and is thereby accessible to be pulled. In this embodiment, the pannier release handle causes the bottom portions of the first pair of connectors to rotate away from the second pair of connectors when pannier release handle is pulled upward, thereby detaching the pannier container from the rack attachment bracket, and thus from the rack if the rack attachment bracket is attached to the rack.

In accordance with certain embodiments, the first pair of connectors comprise first and second female connectors, and the second pair of connectors comprise first and second male connectors. In an embodiment, each of the male connectors includes a base that is attached to the side the pannier container by one or more fasteners. Each of the male connectors also include an upper protrusion that extends from an upper portion of the base, and a lip that extends downward from the upper protrusion. Additionally, each male connector can include a lower male protrusion that extends from a lower portion of the base. In an embodiment, the magnet of each male connector is positioned between the upper and lower protrusions of the male connector. In an embodiment, each of the female connectors includes a body having an upper portion and a lower portion. The upper portion of the body of the first female connector hangs from a first rectangular ring that attaches the first female connector to the rack attachment bracket. The upper portion of the body of the second female connector hangs from a second rectangular ring that attaches the second female connector to the rack attachment bracket. The lower portion of the body of the first female connector is attached to a first end of the pannier release handle. The lower portion of the body of the second female connector is attached to a second end of the pannier release handle. In an embodiment, the magnet of each female connector is positioned between the upper and lower portions of the body of the female connector.

In alternative embodiments, every one of the connectors need not include a magnet. For example, in certain embodiments only one of a first female connector and a first male connector may include a magnet that causes the first female connector and the first male connector to be attracted to one another and thereby to align with and connect to one another when they are brought within about one inch of one another. Similarly, only one of a second female connector and a second male connector may include a magnet that causes the second female connector and the second male connector to be attracted to one another and thereby to align with and connect to one another when they are brought within about one inch of one another. In such embodiments, the portions of the connectors (that do not include magnets) that are indented to align with the connectors that do include magnets should be made of or include a metal to which magnets are attracted.

Certain embodiments of the present invention relate to methods for quickly and easily attaching and detaching a pannier container to and from a rack of a bicycle, motorcycle, or the like. Certain such methods are for use with a rack, a rack attachment bracket, and pannier container. The rack attachment bracket has a first pair of connectors that are attached to the rack attachment bracket, wherein each connector of the first pair of connectors includes a magnet. The pannier container has a second pair of connectors attached to a side of the pannier container, wherein each connector of the second pair of connectors includes a magnet. In accordance with an embodiment, a method involves attaching the rack attachment bracket to the rack of a bicycle, motorcycle, or the like. The method also involves attaching the pannier container to the rack attachment bracket, and thereby to the rack to which the rack attachment bracket is attached, by positioning the first pair of connectors within close proximity of the second pair of connectors so that attraction between the magnets of the first pair of connectors and the magnets of the second pair of connectors cause the first and second pair of connectors to align with and connect to one another. The positioning can involve manually maneuvering the pannier container so that a first one of the second pair of connectors is within about one inch of a first one of the first pair of connectors, and so a that a second one of the second pair of connectors is within about one inch of a second one of the first pair of connectors. The method can also involve using a pannier release handle to detach the pannier container from the rack. The pannier release handle can have a first end attached to a first one of the first pair of connectors and a second end attached to a second one of the first pair of connectors. The using the pannier release handle can include pulling on the pannier release handle to thereby cause the first pair of connectors to be disconnected from the second pair of connectors, and thereby causing the pannier container to be disconnected from the rack.

This summary is not intended to summarize all of the embodiments of the present invention. Further and alternative embodiments, and the features, aspects, and advantages of the embodiments of invention will become more apparent from the detailed description set forth below, the drawings and the claims.

DETAILED DESCRIPTION

In the following detailed description, reference is made to the accompanying drawings that form a part hereof, and in which is shown by way of illustration specific illustrative embodiments. It is to be understood that other embodiments may be utilized and that mechanical changes may be made. The following detailed description is, therefore, not to be taken in a limiting sense. In the description that follows, like numerals or reference designators will be used to refer to like parts or elements throughout. In addition, the first digit of a reference number identifies the drawing in which the reference number first appears.

Certain embodiments of the present invention generally relate to pannier mounting systems that rely on the use of magnets to easily and quickly attach a pannier container to a rack by bringing one or more connectors attached to the pannier container in close proximity to one or more connectors attached to the rack (directly, or by means of a rack attachment bracket) and relying on one or more magnets to cause the one or more connectors attached to the pannier container to align with and connect to the one or more connectors attached to the rack. Exemplary implementations of such embodiments are described below with reference to FIGS. 1-4. However, embodiments of the present invention are not intended to be limited to the specific implementations shown in the FIGS. 1-4.

FIG. 1 shows a pannier mounting system 100, according to an embodiment of the present invention, which is useful for quickly and easily attaching and detaching a pannier container 103 to and from a rack 105, which can also be referred to as an accessory rack. More specifically, FIG. 1 shows a first portion 101 of the pannier mounting system that is attached to the rack 105, and a second portion 102 of the pannier mounting system that is attached to a backside of the pannier container 103.

The rack 105 can be attached to a bicycle, motorcycle, or other wheeled vehicle, such that the rack 105 extends over one of the wheels of the vehicle. The rack 105 is shown as including crossbars 106 and side rails 107. The specific rack 105 shown in FIG. 1 is not intended to limit the scope of the embodiments of the present invention, as the pannier mounting system 100 can be used with myriad of different racks 105.

The pannier container 103, which can also be referred to simply as the pannier 103, can be made of a strong pliable cloth or cloth-like natural or synthetic material, similar to materials often used for duffle bags and messenger bags. Alternatively, the pannier container 103 can be made of metal and/or hard plastic so as to have a generally rigid construction that maintains a predetermined (e.g., box-like) shape. The pannier container 103 can have a flap-like lid that can be opened to enable a person to place supplies into, and remove supplies from, an interior of the container 103. The pannier container 103 can include alternative types of lids and can include additional pockets for holding supplies. The pannier container 103 preferably includes a pannier carrying handle 104 that enables a rider or person to hold the pannier container 103 with only one hand. The pannier container 103 can also include a permanent or attachable shoulder strap that enables a rider or person to sling the strap over one of their shoulders for hands free carrying of the pannier container 103 when it is detached from the rack 105. The specific pannier container 103 shown in FIG. 1B is not intended to limit the scope of the embodiments of the present invention, as the pannier mounting system 100 can be used with myriad of differently pannier containers 103, so long as the second portion 102 of the pannier mounting system 100 is attached to a backside or other side of the pannier container 103.

Referring to FIG. 1, the first portion 101 of the pannier mounting system 100 is shown as including a lower plate 112 and an upper plate 122 that are configured to be secured, respectively, above and below the crossbars 106 or some other portion(s) of the rack 105. In one embodiment, the plates 112, 122 are secured to one another, with the rack crossbars 106 therebetween, by four threaded bolts 116 (one of which cannot be seen in FIG. 1 since its view is blocked) that are inserted into aligned holes or openings in the plates 112, 122. Alternatively, more or less than four bolts 116 can be used. The bolts 116 can be fastened using matching nuts. Alternatively, the lower plate can include threaded holes or openings that are matched to the bolts 116, thereby eliminating the need for the nuts. In accordance with certain embodiments, the plates 112, 122 are made of a metal, such as, but not limited to, steel, aluminum or titanium. In other embodiments, the plates 112, 122 are made of a non-metal material, such as, but not limited to, plastic or carbon fibers. It is also possible that the plates are made of a combination of metal and non-metal materials.

The upper plate 122 includes a downwardly extending flange 124 that is intended to lie against a side rail 107 of the rack 105, to thereby keep the plates 112, 122 from sliding sideways along the cross bars 106 of the rack 105. The bolts 116 keep the plates 112, 122 from sliding forward or backward along the side rails 107 of the rack 105. The upper plate 122 also includes slots 140 through which ends of a pannier release handle 142 are fed and which keep the pannier release handle 142 in place. Each of the slots 140 is aligned with and setback from one of the ring holders 126. In the arrangement shown in FIG. 1, portions of the pannier release handle 142 that rest between the female connectors 132 and the adjacent side rail 107 of the rack 105 prevent female connector 132 from banging or scratching against the side rail 107.

The plates 112, 122 can more generally be referred to as a rack attachment bracket 110 (or simply a bracket 110) that attaches the first portion 101 of the pannier mounting system 100 to a rack, such as the rack 105. Alternative configurations for the bracket 110, which attaches the first portion 101 of the pannier mounting system 100 to a rack, are also within the scope of embodiments of the present invention. For example, the bracket 110 can include the upper plate 122, but not the lower plate 112, wherein the upper plate 122 can be attachable to a rack using one or more attachment devices, such as, but not limited to, one or more clips, clamps, cable ties, or combinations thereof.

In an embodiment, a pair of ring holders 126 extend outward from the upper plate 122, beyond the adjacent side rail 107 of the rack. In the embodiment shown in FIG. 1, the pair of ring holders 126 are located on opposite sides of the flange 124. Each ring holder 126 holds a rectangular ring 128 so that the rectangular ring 128 is not removable from the ring holder 126, but so that rectangular ring 128 can be readily rotated about the portion of the ring within or grasped by the ring holder 126. In certain embodiments, each ring holder 126 is integrally formed with the upper plate 122, as shown in FIG. 1. In one embodiment, the upper plate 122 is cut from a flat sheet of metal such that two rectangular arms protrude outwardly from a main portion of the upper plate 122, e.g., as shown in FIGS. 3 and 4. Each of the two rectangular arms are then bent upwards and backwards into a loop to form the ring holders 126 shown in FIG. 1. As shown in FIGS. 3 and 4, the flat sheet of metal (used to form the upper plate 122) can also be cut to include a further rounded edged rectangle, between the two rectangular arms, which is then bent downward to form the flange 124 shown in FIG. 1. In an alternative embodiment, each ring holder 126 can extend from the lower plate 112, and thus, can be integrally formed with the lower plate 112. It is also possible that each ring holder 126 is formed separately from both plates 112, 122, and is thereafter attached to one of the plates 112, 122.

Each rectangular ring 128 includes an upper side, a lower side, a left side and a right side. Each rectangular ring 128 can be formed, e.g., by bending a tubular or cylindrical rod into a rectangular shape, or by molding or casting, but is not limited thereto. In the embodiment shown in FIG. 1, each rectangular ring 128 is shown as including rounded corners, but can alternatively include sharper corners. It is the upper side of each rectangular ring 128 that is held or grasped by one of the ring holders 126.

Also shown in FIG. 1 are two female connectors 132, details of which will be explained in more detail with reference to FIGS. 2A-2E. An upper portion of each female connector 142 is attached to a bottom side of one of the rectangular rings 128. The pair of female connectors 142 are configured to be selectively attached to a pair of male connectors 152 that are attached to the pannier container 103, e.g., by one or more rivets, nuts and bolts, or other fasteners. The first portion 101 of the pannier mounting system 100 is also shown as including the pannier release handle 142, which can be made, e.g., of natural or synthetic webbing, and which will be described in additional details with reference to FIGS. 2A-2D. Additional details of the male connectors 152 are also explained below with reference to FIGS. 2A-2E.

Still referring to FIG. 1, in accordance with an embodiment the pannier mounting system 100 also includes an spike 148 that attaches at a lower portion of the rack 104 and/or to a lower portion of a frame of the vehicle (e.g., bicycle or motorcycle) to which the rack 104 is attached. As shown in FIG. 1, the spike 148 has a free end that points upwards. The backside of the pannier includes a pocket or loop 149 into which the spike 148 is intended to be inserted. The pocket or loop 149 can be made of webbing, or from the same material used to make the pannier container 103, but is not limited thereto.

The spike 148 and the pocket or loop 149 are used to keep the lower portion of the pannier container 103 from flopping around when the pannier container 103 is mounted to the rack 105 and the wheeled vehicle (to which the rack 105 is attached) is being ridden. The spike 148 and the pocket or loop 149 also help support the pannier container 103 after it is detached from the rack in response to a person pulling up on the pannier release handle 142, further details of which are discussed below.

FIGS. 2A-2C will now be used to explain how the female and male connectors 132, 152 are selectively attached to one another to thereby mount the pannier container 103 to the bracket 110, and thereby, to the rack 105 (not specifically shown in FIGS. 2A-2E) to which the bracket 110 is attached. FIGS. 2D and 2E will be used to explain how the female and male connectors 132, 152 are selectively detached from one another to thereby remove the pannier container 103 from the bracket 110, and thereby, from the rack 105 (not specifically shown in FIGS. 2A-2E) to which the bracket 110 is attached. FIGS. 2A-2E will also be used to explain additional details of the female and male connectors 132, 152, and more generally, of the first and second portions 101, 102 of the pannier mounting system 100, according to an embodiment of the present invention. Only one of the female connectors 132 and one of the male connectors 152 can be seen in FIGS. 2A-2E, due to these FIGS. being side views. The other one female connectors 132 includes the same components and operates in the same manner as the female connector 132 shown in FIGS. 2A-2E; and the other one male connectors 152 includes the same components and operates in the same manner as the male connector 152 shown in FIGS. 2A-2E.

Referring to FIG. 2A, the female connector 132 is shown as including a body 234 including a magnet 235. The magnet 235 can be encased within the body 234 or attached to a side of the body 234. An upper portion 236 of the body 234 (of the female connector 132) includes a ring attachment opening (e.g., a bore or loop) that is used to attach the upper portion 236 of the body 234 to a lower side of the rectangular ring 128, so that the body 234 hangs from the rectangular ring 128. The ring attachment opening in the upper portion 236 of the body 234 allows the ring 128 and the body 234 to rotate relative to one another. A lower portion 237 of the body 234 (of the female connector 132) is attached to an end of the pannier release strap 142, e.g., by looping an end of the strap 142 through a strap attachment opening (e.g., a slot, bore or loop) that is located within or extends from the lower portion 237 of the body 234. Alternatively, an end of the pannier release strap 142 can be attached to the lower portion 237 of the body 234 (of the female connector 132) by a rivet, a nut and bolt, or by some other fastener. The female connector 132 also includes an angled protrusion 238 (which can also be referred to as a female stop 238) that extends from and is attached to the body 234 at one end and has a free end at its other end. In FIG. 2A, the female stop 238 is shown as being an angled cantilevered protrusion that extends from a portion of the body 234 at approximately forty-five degrees. A small gap 239 is located between the main portion of the body 234 and the female stop 238.

Still referring to FIG. 2A, the male connector 152 is shown as including a base 254 including a magnet 255. The magnet 255 can be encased within the base 254 or attached to a side of the base 254. In an embodiment, the base 254, and more generally the male connector 152, is permanently attached to the backside of the pannier bag 103 by one or more rivets, nuts and bolts, or some other fasteners. An upper protrusion 256 extends at a right angle from an upper portion of the base 254. A lip 257 extends downward from the upper protrusion 256, causing the upper protrusion and lip to collectively resemble a sideways claw or hook. A lower male protrusion 258, which can also be referred to as male stop, extends from a lower portion of the base 254. The magnet 255 has an opposite polarity than the magnet 234 so that the two magnets are attracted to one another. More specifically, the sides of the magnet 234 and 255 that face one another have opposite polarities, so that they are attracted to one another.

FIG. 2A illustrates how a person holding the pannier carrying handle 104 with one hand can move the pannier container 103 in a direction toward the bracket 110, as shown by the arrow 240, so as to attempt to generally align the male connectors 152 with the female connectors 132. If the optional spike 148 is attached to the rack 105 or vehicle frame, as shown in FIG. 1 (but not shown in FIGS. 2A-2E), then the person should insert the spike 148 into the pocket 149 on the backside of the pannier container 103 before or during movement of the pannier container 103 toward the bracket 110. FIG. 2B illustrates that the once the female and male connectors 132, 152 are within a relatively close distance (e.g., within about 1 or 2 inches) of one another, the opposite polarity magnets 234, 255 (of the female and male connectors 132, 152, respectively) are sufficiently attracted to one another so as to cause the body 234 of the female connector 132 to move towards the base 254 of the male connector 252. More specifically, the female connector 132, which is hanging from the rectangular ring 128, is pulled sideways towards the male connector 152. Because the female connector 132 is connected to the bracket 110 by the rectangular ring 128, the female connector 132 also moves slightly upward at the same time that it moves sideways as the female connector 132 swings toward the male connector 152. In this manner, as a person moves the pannier container 103 towards the bracket 110, magnetic attraction causes the female and male connectors 132, 152 to move towards one another (as shown by the two ended arrow 242 in FIG. 2B) and properly align with one another. This causes the female connector 132 and the male connector 152 to connect to one another, as shown in FIG. 2C, without requiring a person manipulate or touch in any manner the female and male connectors 132, 152. Indeed, the female and male connectors 132, 152 properly align with and engage one another so easily that a person can attach the female and male connectors 132, 152 to one another with their eyes closed. The stronger the magnets 234, 255 the greater the distance at which attraction between opposing magnets occurs, and thus, the less close the female and male connectors 132, 152 need to be positioned relative to one another before they automatically align and engage with one another due to magnetic attraction.

As can be seen from FIG. 2C, a lower surface of the upper protrusion 256 (of the male connector 152) rests on and is supported by an upper surface of the body 234 (of the female connector 132). The body 234 (of the female connector 132) hangs from and is supported by the rectangular ring 128. The rectangular ring 128 hangs from and is supported by the ring holder 126 of the bracket 110. It is this linkage that supports the weight of the pannier container 103 and its contents. Accordingly, it is not the attraction between the magnets that is being relied upon to support the weight of the pannier container 103 and its contents. However, the magnets do assist in preventing inadvertent disengagement of the female and male connectors 132, 152, and thus inadvertent detachment of the pannier container 103 from the rack. As can also be seen in FIG. 2C, the male stop 258 (of the male connector 152) rests within the gap 239 between the main portion of the body 234 (of the female connector 132) and the female stop 238. At this point, the pannier container 103 is sturdily mounted to the bracket 108, and thus, to the rack to which the bracket 108 is attached. The lip 257 (that extends downward from the upper protrusion 256 of the male connector 152) keeps the upper portion of the body 234 of the female connector 132 and the upper protrusion 256 from inadvertently becoming disengaged from one another. The male stop 258 and the female stop 238 collectively keep the lower portion of the body 234 (of the female connector 132) in place so as to prevent the inadvertent disengagement of lower portions of the female and male connectors 132, 152 (e.g., when a vehicle having the rack 105 to which the pannier container 103 is mounted rides over rocks or other bumps). In accordance with an embodiment, weight supporting components of the female connectors 132 and the male connectors 152 are made of steel or some other sufficiently strong metal that enables the pannier mounting system 100 to have a weight limit that exceeds one-hundred pounds. Lower or higher weight limits are also within the scope of embodiments of the present invention.

FIGS. 2D and 2E will now be used to explain how the female and male connectors 132, 152 are selectively disconnected from one another to thereby detach the pannier container 103 from the bracket 110, and thereby, from the rack 105 (not specifically shown in FIGS. 2A-2E). Referring to 2D, a person's hand is shown as grasping the pannier release handle 142 and pulling it upward, as shown by the arrow 244. Because each of the two ends of the pannier release handle 142 is attached to a lower portion of the body 234 of each of the female connectors 132, and because of the setback positions of the slots 140, the body 234 (of the female connector 132) rotates relative to the base 254 (of the male connector 152) such that the lower portion of the body 234 (of the female connector 132) is pulled away from the base 254 (of the male connector 152), as shown in FIG. 2D by the curved arrow 245. This rotation of the body 234 of the female connector 132 relative to the base 254 (of the male connector 152) provides a sufficient force to overcome the attraction of the respective magnets. Referring to FIG. 2E, at this point the person that pulled pannier release handle 142 using one hand can use their other hand, which is preferably grasping the pannier carrying handle 104, to move the pannier contain 103 away from the bracket 110, and thus away from the rack, as shown the arrow 246 in FIG. 2E.

Referring briefly back to FIG. 1, if the spike 148 is resting within the pocket or loop 149 at the lower portion of the backside of the pannier container 103 when the pannier release handle 142 is pulled upward, then the spike 148 will support the weight of the pannier container 103, even if a person is not grasping the pannier carrying handle 104. However, if the spike 148 is not resting within pocket 149 at the lower portion of the backside of the pannier container 103 when the pannier release handle 142 is pulled upward, then the pannier container 103 will drop to the ground unless a person is grasping the pannier carrying handle 104.

FIG. 3 illustrates the shapes and dimensions of the lower plate 112 and the upper plate 122 of the bracket 110, which were introduced in FIG. 1, according to an embodiment. In accordance with an embodiment, the four holes 302 on the lower plate 112 are threaded, for reasons explained above in the discussion of FIG. 1. The four holes 304 on the upper plate 122 are aligned with the four holes 302 in the lower plate. FIG. 4 illustrates alternative the shapes and dimensions of the lower plate 112 and the upper plate 122 of the bracket 110, which were introduced in FIG. 1, according to an embodiment. In the embodiment of FIG. 4, the lower plate 112 includes channels 402 and the upper plate includes channels 404 through which bolts can be inserted to attach the plates to one another with a portion of a rack therebetween. The use of other shapes and dimensions for the lower and upper plates 112, 122, or more generally alternative rack attachment brackets 110, are also within the scope of embodiments of the present invention. It is also within the scope of an embodiment that a rack (similar to the rack 105 shown in FIG. 1) is manufactured to include the ring holders 126 that hold the rectangular rings 128 and the slots 140 that hold the pannier release handle 140 in place, thereby eliminating the need for the rack attachment bracket 110.

Figure 5:
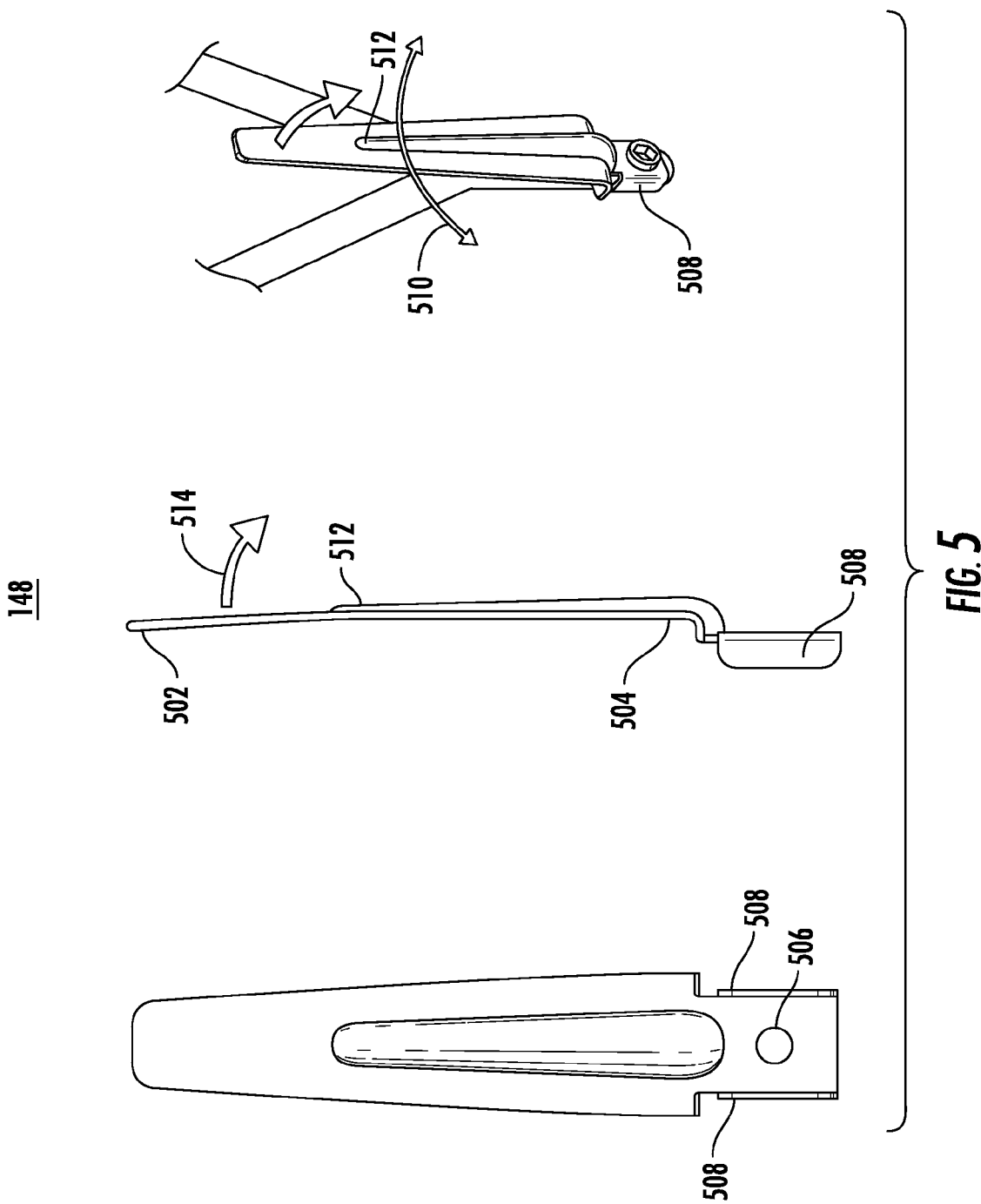
FIG. 5 illustrates the shape and dimensions of an optional spike, which was introduced in FIG. 1, according to an embodiment.

FIG. 5 includes back, side and perspective views of the optional spike 148, which was introduced in FIG. 1, according to an embodiment. More specifically, FIG. 5 illustrates the shape and dimensions of the optional spike 148, which was introduced in FIG. 1, according to an embodiment. Referring to FIG. 5, a top portion 502 of the spike is shown as being slightly curved inwards relative to a lower portion 504 of the spike 148. In an embodiment, the opening 506 is the single attachment point for the spike 148. Side flanges 508 prevent the spike 148 from rotating side to side, as represented by the arrow 510, since there is only the single attachment point. A raised bubble 512 adds strength to prevent the spike from bending outward, in the direction of the arrow 514, when loaded. The use of alternative shapes and dimensions for the spike 148 are also within the scope of embodiments of the present invention. It is also within the scope of an embodiment that a rack (similar to the rack 105 shown in FIG. 1) is manufactured to include the spike 148 or a similar spike.

Figure 6:
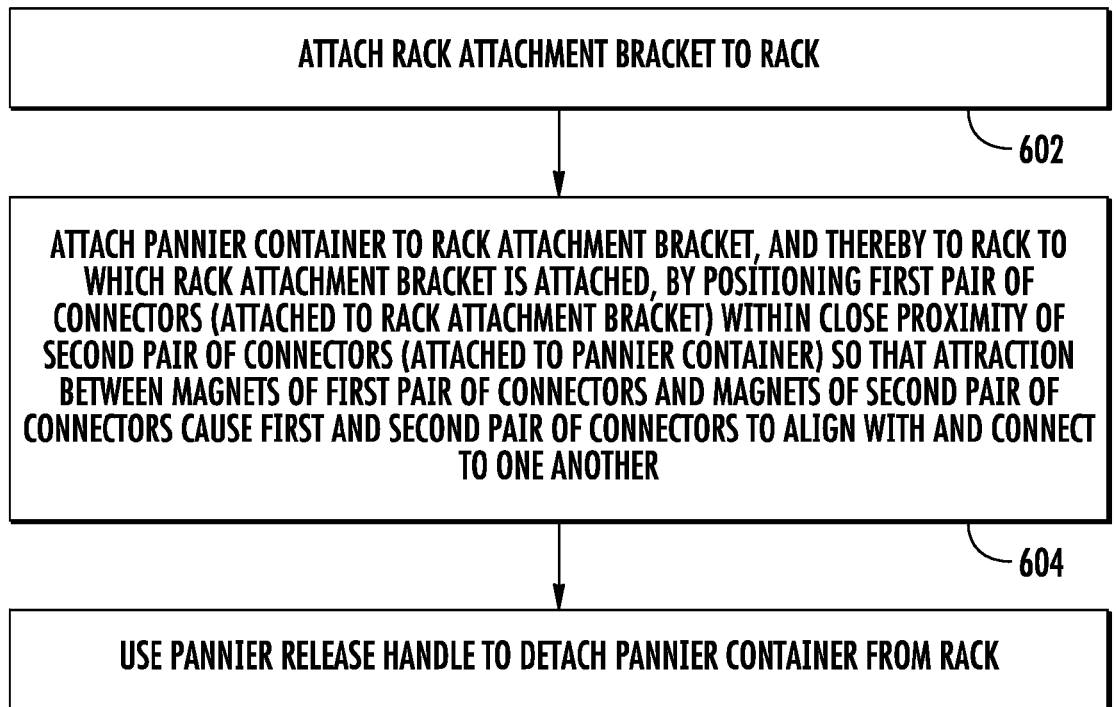

FIG. 6 is a high level flow diagram that is used to summarize methods, according to embodiments of the present invention, for quickly and easily attaching and detaching a pannier container to and from a rack of a bicycle, motorcycle, or the like. Certain such methods are for use with a rack, a rack attachment bracket, and a pannier container. The rack attachment bracket has a first pair of connectors that are attached to the rack attachment bracket, wherein each connector of the first pair of connectors includes a magnet. The pannier container has a second pair of connectors attached to a side of the pannier container, wherein each connector of the second pair of connectors includes a magnet. Referring to FIG. 6, step 602 involves attaching the rack attachment bracket to the rack of a bicycle, motorcycle, or the like. Additional details of how to attach a rack attachment bracket to a rack are discussed above with reference to FIGS. 1, 3 and 4. Step 604, involves attaching the pannier container to the rack attachment bracket, and thereby to the rack to which the rack attachment bracket is attached, by positioning the first pair of connectors within close proximity of the second pair of connectors so that attraction between the magnets of the first pair of connectors and the magnets of the second pair of connectors cause the first and second pair of connectors to align with and connect to one another. The positioning at step 604 can involve manually maneuvering the pannier container so that a first one of the second pair of connectors is within about one inch of a first one of the first pair of connectors, and so a that a second one of the second pair of connectors is within about one inch of a second one of the first pair of connectors. Step 606 involves using a pannier release handle to detach the pannier container from the rack. The pannier release handle can have a first end attached to a first one of the first pair of connectors and a second end attached to a second one of the first pair of connectors. The using the pannier release handle at step 606 can include pulling on the pannier release handle to thereby cause the first pair of connectors to be disconnected from the second pair of connectors, and thereby causing the pannier container to be disconnected from the rack. Additional details of steps 604 and 606 are discussed above with reference to FIGS. 1 and 2A-2E.

The method can also include, prior to step 604, attaching a spike (e.g., 148, but not limited thereto) to a lower portion of the rack or the frame to which the rack is attached. Then, after step 602, and prior to or simultaneously with step 604, the method can also include slipping a loop or pocket (e.g., 149, but not limited thereto) on the side of the pannier bag over a top portion of the spike. As explained above, the spike and the pocket or loop are used to keep the lower portion of the pannier container from flopping around when the pannier container is mounted to the rack of a bicycle, motorcycle, or the like, while it is being ridden. Additionally, the spike and the pocket or loop also help support the pannier container after it is detached from the rack using pannier release handle at step 606.

While specific embodiments were described above, certain embodiment of the present invention are more generally directed to the use of magnets to easily and quickly attach a pannier container to a rack by bringing one or more connectors attached to the pannier container in close proximity to one or more connectors attached to the rack (directly, or by means of a rack attachment bracket) and relying on one or more magnets to cause the one or more connectors attached to the pannier container to align with and connect to the one or more connectors attached to the rack.

In FIG. 1, only one pannier mounting system 100 is shown as being attached to the rack 105. However, it is likely that two such pannier mounting systems 100 are mounted to the same rack, i.e., one on the left side of the rack and the other on the right side of the rack, so that that two pannier containers 103 can counterbalance one another. If a vehicle (e.g., bicycle or motorcycle) includes two racks, e.g., one extending over a back wheel and another one extending over a front wheel, then two pannier mounting systems 100 can be attached to each rack such that four pannier containers 103 can be mounted to and carried by a single vehicle.

In the above described embodiments, the body 234 of each of the female connectors 132 was described as including a magnet of a first polarity, and the base 254 of each of the male connector 152 was described as including a magnet of a second polarity that is opposite the first polarity. More specifically, in the above described embodiments the side of the magnet of each of the female connector 132 and the side of the magnet of each male connector, that are intended to face one another, have opposite polarities, so that they are attracted to one another. In alternative embodiments a first female connector 132 includes a magnet having a first polarity and a first male connector 152 (intended to attach with the first female connector 132) includes a magnet having a second polarity, opposite the first polarity; and a second female connector 132 includes a magnet having the second polarity and a second male connector 152 (intended to attach with the second female connector 132) includes a magnet having the first polarity. The inclusion of magnets in both the female and male connectors 132, 152 provides for the best attracting of the female and male connectors 132, 152 to one another. In an alternative embodiment, only the female connectors 132 include magnets that are attracted to metal portions of the male connectors 152. Alternatively, only the male connectors 152 include magnets that are attracted to metal portions of the female connectors 132. One or ordinary skill in the art reading this description will understand that other variations are possible that are within the scope of an embodiment of the present invention.

While various embodiments of the present invention have been described above, it should be understood that they have been presented by way of example, and not limitation. It will be apparent to persons skilled in the relevant art that various changes in form and detail can be made therein without departing from the spirit and scope of the invention.

The breadth and scope of the present invention should not be limited by any of the above-described exemplary embodiments, but should be defined only in accordance with the following claims and their equivalents.

What is claimed is:

1. A pannier mounting system for quickly and easily attaching and detaching a pannier container to and from a rack of a bicycle or motorcycle, the pannier mounting system comprising:
  a rack attachment bracket that is adapted to be attached to a rack of a bicycle or motorcycle;
  a pair of rings that hang from the rack attachment bracket;
  a first pair of connectors attached by the pair of rings to the rack attachment bracket, wherein each connector of the first pair of connectors includes a magnet; and
  a second pair of connectors attached to a side of the pannier container, wherein each connector of the second pair of connectors includes a magnet;
  wherein attraction between the magnets of the first pair of connectors and the magnets of the second pair of connectors cause the first and second pair of connectors to align with and connect to one another when they are brought within close proximity to one another; and
  wherein the pair of rings allow the first pair of connectors to move simultaneously sideways and upwards, towards the second pair of connectors, when the first and second pair of connectors are within close proximity to one another, with the simultaneously sideways and upwards movement being caused by the attraction between the magnets of the first pair of connects and the magnets of the second pair of connectors.

2. The pannier mounting system of claim 1, wherein when the first and second pairs of connectors are connected to one another, a downward facing surface of each connector of the second pair of connectors rests on and is supported by an upward facing surface of a corresponding one of the connectors of the first pair of connectors.

3. The pannier mounting system of claim 1, further comprising:
a pannier release handle having a first end attached to one of the connectors of the first pair of connectors and having a second end attached to the other one of the connectors of the first pair of connectors;
wherein the pannier release handle causes the first pair of connectors and the second pair of connectors to disconnect from one another when the pannier release handle is pulled, thereby detaching the pannier container from the rack attachment bracket, and thus detaching the pannier container from the rack if the rack attachment bracket is attached to the rack.

4. The pannier mounting system of claim 3, wherein a graspable portion of the pannier release handle, which is between the first and second ends, rests above an upper surface of the rack attachment bracket.

5. The pannier mounting system of claim 1, wherein:
the pair of rings that hang from the rack attachment bracket comprise a pair of rectangular rings that hang from the rack attachment bracket and that attach the first pair of connectors to the rack attachment bracket;
each of the rectangular rings includes an upper side, a lower side, a left side and a right side; and
the first pair of connectors hang from the lower sides of the rectangular rings.

6. The pannier mounting system of claim 5, wherein the rack attachment bracket include a pair of ring holders that hold the upper sides of the rectangular rings.

7. The pannier mounting system of claim 6, wherein:
the rack attachment bracket includes an upper plate and a lower plate that are configured to be secured, respectively, above and below one or more crossbars or other portion of the rack to thereby attach the bracket to the rack; and
the upper plate includes the pair of ring holders.

8. The pannier mounting system of claim 7, further comprising:
a pannier release handle having a first end attached to a lower portion one of the connectors of the first pair of connectors and having a second end attached to a lower portion of the other one of the connectors of the first pair of connectors;
wherein the upper plate includes a pair of slots that are aligned with and setback from the pair of ring holders;
wherein the pair of slots includes a first slot and a second slot;
wherein a first portion of the pannier release handle, which is adjacent the first end of the pannier release handle, passes through the first slot;
wherein a second portion of the pannier release handle, which is adjacent the second end of the pannier release handle, passes through the second slot;
wherein a center portion of the pannier release handle extends between the first and second slots and rests above the upper plate and is thereby accessible to be pulled; and
wherein the pannier release handle causes the bottom portions of the first pair of connectors to rotate away from the second pair of connectors when pannier release handle is pulled upward, thereby detaching the pannier container from the rack attachment bracket, and thus from the rack if the rack attachment bracket is attached to the rack.

9. The pannier mounting system of claim 1, wherein:
the first pair of connectors comprise first and second female connectors; and
the second pair of connectors comprise first and second male connectors.

10. The pannier mounting system of claim 9, wherein each of the first and second male connectors includes:
a base that is attached to the side of the pannier container by one or more fasteners;
an upper protrusion that extends from an upper portion of the base;
a lip that extends downward from the upper protrusion; and
a lower male protrusion that extends from a lower portion of the base;
wherein the magnet of each of the first and second male connectors is positioned between the upper and lower protrusions of the male connector.

11. The pannier mounting system of claim 10, wherein:
each of the first and second female connectors includes a body including an upper portion and a lower portion;
the pair of rings includes a first ring and a second ring;
the upper portion of the body of the first female connector hangs from the first ring that attaches the first female connector to the rack attachment bracket;
the upper portion of the body of the second female connector hangs from the second ring that attaches the second female connector to the rack attachment bracket;
the lower portion of the body of the first female connector is attached to a first end of a pannier release handle;
the lower portion of the body of the second female connector is attached to a second end of the pannier release handle;
the magnet of the first female connector is positioned between the upper and lower portions of the body of the first female connector; and
the magnet of the second female connector is positioned between the upper and lower portions of the body of the second female connector.

12. A system, comprising:
first and second female connectors adapted to be attached directly to a rack or to a rack attachment bracket that is adapted to be attached to a rack;
a pannier container including an interior in which supplies can be carried;
first and second male connectors attached to a side of the pannier container;
wherein at least one of the first female connector and the first male connector includes a magnet that causes the first female connector and the first male connector to be attracted to one another and thereby to align with and connect to one another when they are brought within about one inch of one another;
wherein at least one of the second female connector and the second male connector includes a magnet that causes the second female connector and the second male connector to be attracted to one another and thereby to align with and connect to one another when they are brought within about one inch of one another;
wherein when the first female connector and the first male connector are connected to one another a downward facing surface of the first male connector rests on and is supported by an upward facing surface of the first female connector;

wherein when the second female connector and the second male connector are connected to one another a downward facing surface of the second male connector rests on and is supported by an upward facing surface of the second female connector;

wherein each of the first and second female connectors includes a body including an upper portion and a lower portion;

wherein the upper portion of the body of the first female connector hangs from a first ring that attaches the first female connector directly to a rack or to a rack attachment bracket that attaches to a rack; and wherein the upper portion of the body of the second female connector hangs from a second ring that attaches the second female connector directly to a rack or to a rack attachment bracket that attaches to a rack.

13. The system of claim 12, wherein each of the first and second male connectors includes:
a base that is attached to the pannier container by one or more fasteners;
an upper protrusion that extends from an upper portion of the base;
a lip that extends downward from the upper protrusion; and
a lower male protrusion that extends from a lower portion of the base.

14. The system of claim 13, further comprising:
a pannier release handle;
wherein the lower portion of the body of the first female connector is attached to a first end of the pannier release handle; and
wherein the lower portion of the body of the second female connector is attached to a second end of the pannier release handle.

15. The system of claim 14, wherein the pannier release handle causes the bottom portions of the first and second female connectors to rotate away from the first and second male connectors when pannier release handle is pulled upward to thereby disconnect the female connectors from the male connectors.

16. A method for use with a rack, a rack attachment bracket and a pannier container, wherein a first pair of connectors are attached to the rack attachment bracket, each connector of the first pair of connectors includes a magnet, a second pair of connectors are attached to a side of the pannier container, and each connector of the second pair of connectors includes a magnet, the method comprising:
attaching the rack attachment bracket to the rack; and
attaching the pannier container to the rack attachment bracket, and thereby to the rack to which the rack attachment bracket is attached, by positioning the first and second pair of connectors within close proximity of one another so that attraction between the magnets of the first pair of connectors and the magnets of the second pair of connectors cause the first pair of connectors that are attached to the rack attachment bracket to move simultaneously sideways and upwards towards the second pair of connectors that are attached to the rack attachment bracket so that the first and second pair of connectors connect to one another and thereby attach the pannier container to the rack attachment bracket.

17. The method of claim 16, wherein the positioning comprises maneuvering the pannier container so that a first one of the second pair of connectors is aligned with and within about one inch of a first one of the first pair of connectors, and so a that a second one of the second pair of connectors is aligned with and within about one inch of a second one of the first pair of connectors.

18. The method of claim 16, further comprising:
using a pannier release handle to detach the pannier container from the rack.

19. The method of claim 18, wherein the first pair of connectors that are attached to the rack attachment bracket each include a lower portion and an upper portion, wherein the pannier release handle has a first end attached to the lower portion of a first one of the first pair of connectors and a second end attached to the lower portion of a second one of the first pair of connectors, and wherein the using the pannier release handle to detach the pannier container from the rack comprises:
pulling on the pannier release handle to thereby cause the lower portions of the first pair of connectors to be rotated and pulled away from the second pair of connectors, which causes the first pair of connectors to be disconnected from the second pair of connectors, and thereby causes the pannier container to be disconnected from the rack attachment bracket, and thus from the rack to which the rack attachment bracket is attached.

20. A pannier mounting system for quickly and easily attaching and detaching a pannier container to and from a rack of a bicycle or motorcycle, the pannier mounting system comprising:
a rack attachment bracket that is adapted to be attached to a rack of a bicycle or motorcycle;
first and second slots included in a portion of the rack attachment bracket;
a first pair of connectors attached to the rack attachment bracket, wherein each connector of the first pair of connectors includes a magnet; and
a second pair of connectors attached to a side of the pannier container, wherein each connector of the second pair of connectors includes a magnet;
a pannier release handle having a first end attached to a lower portion of one of the connectors of the first pair of connectors and having a second end attached to a lower portion of the other one of the connectors of the first pair of connectors;
wherein attraction between the magnets of the first pair of connectors and the magnets of the second pair of connectors cause the first and second pair of connectors to connect to one another when they are brought within close proximity to one another; and
wherein a first portion of the pannier release handle, which is adjacent the first end of the pannier release handle, passes through the first slot;
wherein a second portion of the pannier release handle, which is adjacent the second end of the pannier release handle, passes through the second slot;
wherein a center portion of the pannier release handle extends between the first and second slots and rests above the upper plate and is thereby accessible to be pulled; and
wherein the pannier release handle causes the bottom portions of the first pair of connectors to rotate away from the second pair of connectors when pannier release handle is pulled upward, thereby detaching the pannier container from the rack attachment bracket, and thus from a rack to which the rack attachment bracket may be attached.

21. The pannier mounting system of claim 20, wherein:

the first pair of connectors include a first connector and a second connector;

the first connector is attached to a first portion of the rack attachment bracket;

the second connector is attached to a second portion of the rack attachment bracket;

the first slot is aligned with and setback from the first portion of the rack attachment bracket to which the first connector is attached; and the second slot is aligned with and setback from the second portion of the rack attachment bracket to which the second connector is attached.

22. The pannier mounting system of claim 21, wherein:

the first portion of the rack attachment bracket, to which the first connector is attached, comprises a first ring holder;

the second portion of the rack attachment bracket, to which the second connector is attached, comprises a second ring holder;

a first ring of the pannier mounting system hangs from the first ring holder;

a second ring of the pannier mounting system hangs from the second ring holder;

the first connector is attached to and hangs from the first ring and is thereby attached to the rack attachment bracket by the first ring; and the second connector is attached to and hangs from the second ring and is thereby attached to the rack attachment bracket by the second ring.

23. The system of claim 12, wherein the system further comprises a rack that is adapted to be attached to a bicycle or motorcycle, and wherein the first and second female connectors are attached directly to the rack by the first and second rings.

* * * * *